US011776064B2

(12) United States Patent
Gupta et al.

(10) Patent No.: US 11,776,064 B2
(45) Date of Patent: Oct. 3, 2023

(54) DRIVER CLASSIFICATION SYSTEMS AND METHODS FOR OBTAINING AN INSURANCE RATE FOR A VEHICLE

(71) Applicant: Toyota Motor Engineering & Manufacturing North America, Inc., Plano, TX (US)

(72) Inventors: Rohit Gupta, Santa Clara, CA (US); Ziran Wang, San Jose, CA (US); Kyungtae Han, Palo Alto, CA (US); Prashant Tiwari, Santa Clara, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 11 days.

(21) Appl. No.: 17/410,536

(22) Filed: Aug. 24, 2021

(65) Prior Publication Data
US 2023/0061846 A1  Mar. 2, 2023

(51) Int. Cl.
G06Q 40/08 (2012.01)
G06N 20/00 (2019.01)
G07C 5/00 (2006.01)
G07C 5/08 (2006.01)

(52) U.S. Cl.
CPC ............. *G06Q 40/08* (2013.01); *G06N 20/00* (2019.01); *G07C 5/008* (2013.01); *G07C 5/0808* (2013.01)

(58) Field of Classification Search
CPC .................................................... G06Q 40/08
See application file for complete search history.

(56) References Cited

U.S. PATENT DOCUMENTS

| 6,064,970 A | 5/2000 | McMillan et al. |
| 8,090,598 B2 | 1/2012 | Bauer et al. |
| 8,180,655 B1 | 5/2012 | Hopkins, III |
| 10,407,078 B2 | 9/2019 | Ratnasingam |

(Continued)

FOREIGN PATENT DOCUMENTS

| CN | 108492053 A | 9/2018 |
| KR | 20170115831 A | * 10/2017 |
| KR | 1020200011828 A | 2/2020 |

OTHER PUBLICATIONS

Turner, "Categorizing Driver Risk with Machine Learning", Microsoft CSE Developer Blog, Jan. 7, 2016. (https://devblogs.microsoft.com/cse/2016/01/07/categorizingdriver-risk-with-machine-learning/).

(Continued)

*Primary Examiner* — Edward Chang
(74) *Attorney, Agent, or Firm* — Dinsmore & Shohl LLP (57) ABSTRACT

Driver classification systems and methods are disclosed herein. The driver classification method includes collecting first vehicle driving data from a first vehicle, processing the first vehicle driving data using a driver classification learning model including a machine learning algorithm at one of an edge server and the first vehicle to assign a driver classification to the first vehicle, updating the driver classification learning model based on additional driver classification learning models received from a plurality of additional vehicles, sending the driver classification to an insurance provider, receiving an insurance rate for the first vehicle from the insurance provider based on the driver classification of the first vehicle, and providing the insurance rate to the first vehicle.

17 Claims, 4 Drawing Sheets

(56) References Cited

U.S. PATENT DOCUMENTS

| | | |
|---|---|---|
| 10,830,605 B1 | 11/2020 | Chintakindi et al. |
| 2002/0128882 A1 | 9/2002 | Nakagawa et al. |
| 2013/0297418 A1 | 11/2013 | Collopy et al. |
| 2017/0255966 A1* | 9/2017 | Khoury ................. B60W 40/00 |
| 2017/0297583 A1 | 10/2017 | Osumi et al. |
| 2019/0113632 A1 | 4/2019 | Lucrecio et al. |
| 2019/0122563 A1* | 4/2019 | Wahl ....................... H04W 4/38 |
| 2020/0017117 A1 | 1/2020 | Milton |
| 2020/0334924 A1 | 10/2020 | Wells et al. |
| 2021/0174257 A1 | 6/2021 | Pothula et al. |

OTHER PUBLICATIONS

Delbridge, "What Type of Driver Risk Are You?", the balance, Dotdash publishing, May 18, 2020. (https://www.thebalance.com/what-type-of-driver-risk-are-you-527282).

Hanafy et al., "Machine Learning Approaches for Auto Insurance Big Data", MDPI Journal. Risks 9: 42. https://doi.org/10.3390/risks9020042, Feb. 20, 2021.

* cited by examiner

DRIVER CLASSIFICATION SYSTEMS AND METHODS FOR OBTAINING AN INSURANCE RATE FOR A VEHICLE

TECHNICAL FIELD

The present specification generally relates to systems and methods for obtaining an insurance rate based on driving behavior of a vehicle and, more specifically, systems and methods for determining a driver classification of a vehicle to obtain an insurance rate for a vehicle.

BACKGROUND

Insurance providers calculate insurance rates for drivers of vehicles based on a number of parameters and characteristics. For example, insurance providers typically take into consideration data specific to the driver of the vehicle such as, for example, age, gender, ethnicity, and the like, as well as a driving history of the driver. However, user privacy is a big concern, especially given the recent increase in the number of data breaches in companies that collect this type of information. Therefore, it is desired to obtain an insurance rate without providing this type of personal user-specific information. Rather, it is desired to obtain an insurance rate based solely on a categorized driver classification of a driver of a vehicle.

Accordingly, a need exists for improved systems and methods for obtaining an insurance rate for a vehicle that without providing user date for a driver of the vehicle.

SUMMARY

In one embodiment, a method includes: collecting first vehicle driving data from a first vehicle; processing the first vehicle driving data using a driver classification learning model including a machine learning algorithm at one of an edge server and the first vehicle to assign a driver classification to the first vehicle; updating the driver classification learning model based on additional driver classification learning models received from a plurality of additional vehicles; sending the driver classification to an insurance provider; receiving an insurance rate for the first vehicle from the insurance provider based on the driver classification of the first vehicle; and providing the insurance rate to the first vehicle.

In another embodiment, a driver classification system includes: a controller configured to: collect first vehicle driving data from a first vehicle; process the first vehicle driving data using a driver classification learning model including a machine learning algorithm to assign a driver classification to the first vehicle; receive additional driver classification learning models from a plurality of additional vehicles; update the driver classification learning model of the first vehicle based on the additional driver classification learning models received from the plurality of additional vehicles; receive an insurance rate for the first vehicle from an insurance provider based on the driver classification of the first vehicle; and provide the insurance rate and the updated driver classification learning model to the first vehicle.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein are directed to driver classification systems and methods for assigning a driver classification to a vehicle for purposes of sending the driver classification to an insurance provider and obtaining an insurance rate.

The systems and methods disclosed herein generally include collecting first vehicle driving data from a first vehicle, processing the first vehicle driving data using a driver classification learning model including a machine learning algorithm to determine a driver classification of the first vehicle, sending the driver classification to an insurance provider, and receiving an insurance rate from the insurance provider. Various embodiments of the driver classification systems and methods and the operation of the driver classification systems are described in more detail herein. Whenever possible, the same reference numerals will be used throughout the drawings to refer to the same or like parts.

Figure 1:
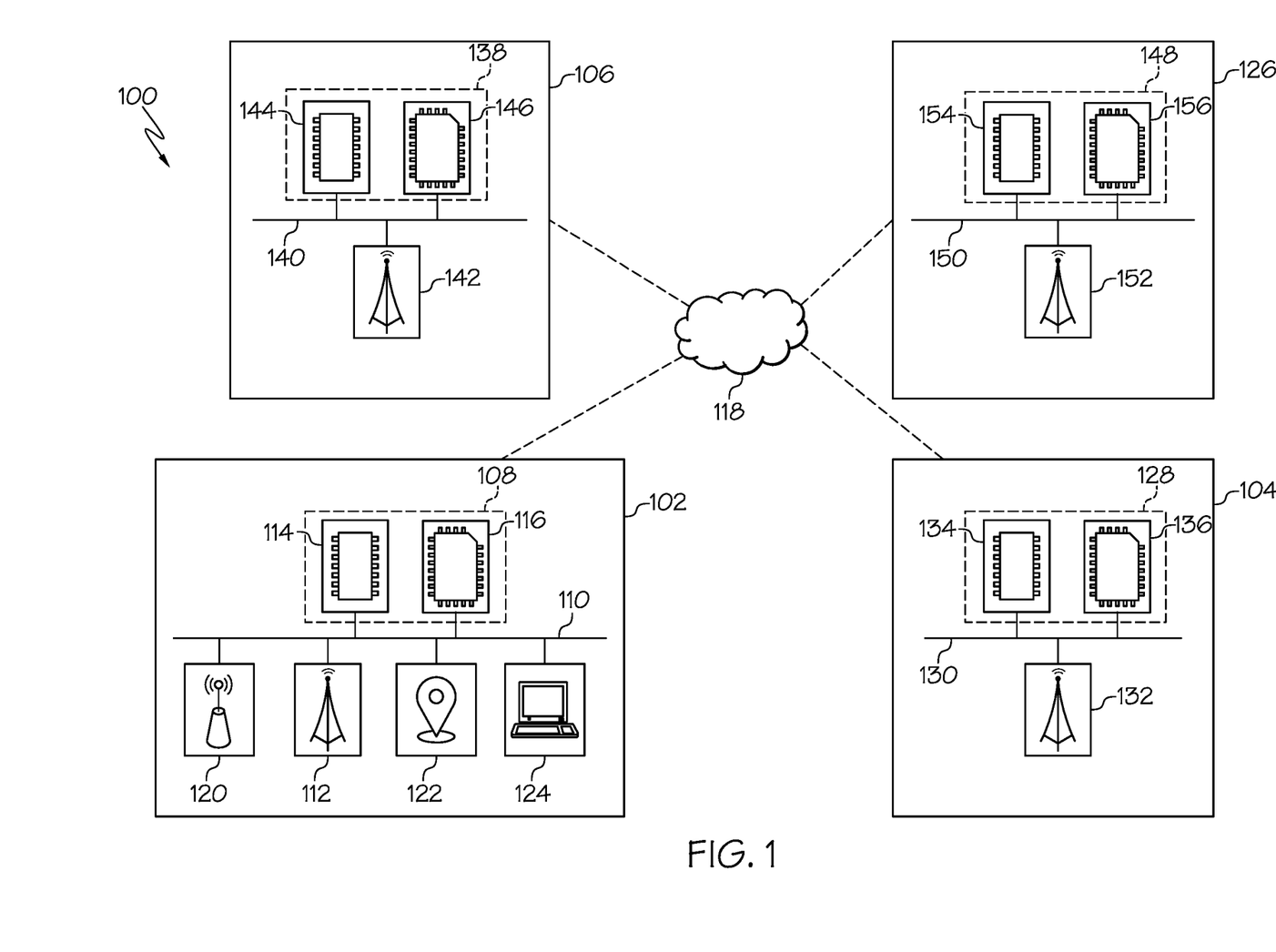
FIG. 1 schematically depicts components of a driver classification system including a first vehicle, an edge server, a central server, and an insurance provider, according to one or more embodiments shown and described herein.

Referring now to FIG. 1, a driver classification system 100 is illustrated according to one or more embodiments described herein. The driver classification system 100 may generally include a first vehicle 102, an edge server 104, and a central server 106. It should be appreciated that the driver classification system 100 may include a plurality of vehicles and a plurality of edge servers such that each edge server is assigned to a particular or predetermined geographic region and communicates with those vehicles in the particular geographic region. In embodiments, the particular edge server only communicates with those vehicles of a plurality of vehicles in the particular geographic region.

It should be appreciated that by assigning an edge server 104 to a particular geographic region, the required time and processing power required to analyze data received from the vehicles is less than that required by processing additional information outside of the geographic region that may be unnecessary for the particular edge server. Additionally, by allocating an edge server to each geographic region and individually communicating with the central server 106 to distribute the workload among the plurality of edge servers, the latency of data transmitted to the central server 106 is reduced. However, for purposes discussed herein, only the first vehicle 102 and the edge server 104 will be discussed in detail.

As shown in FIG. 1, a schematic diagram of the driver classification system 100 is depicted illustrating individual hardware components of the first vehicle 102, the edge server 104, and the central server 106. As noted above, it should be appreciated that any number of vehicles may be provided and include the same structure and components. Similarly, it should be appreciated that any number of edge servers may be provided and include the same structure and components. As such, only the structure and components of the first vehicle 102 and the edge server 104 is discussed in detail herein.

In embodiments, the first vehicle 102 includes a controller 108, a communication path 110, and network interface hardware 112. The communication path 110 may be formed from any medium that is capable of transmitting a signal such as, for example, conductive wires, conductive traces, optical waveguides, or the like. Moreover, the communication path 110 may be formed from a combination of mediums capable of transmitting signals. In one embodiment, the communication path 110 includes a combination of conductive traces, conductive wires, connectors, and buses that cooperate to permit the transmission of electrical data signals to components such as processors, memories, sensors, input devices, output devices, and communication devices. Accordingly, the communication path 110 may include a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 110 communicatively couples the various components of the first vehicle 102. As used herein, the term "communicatively coupled" means that coupled components are capable of exchanging data signals with one another such as, for example, electrical signals via conductive medium, electromagnetic signals via air, optical signals via optical waveguides, and the like.

As noted above, the first vehicle 102 includes the controller 108 including one or more processors 114 and one or more memory modules 116. Each of the one or more processors 114 may be any device capable of executing machine readable instructions. Accordingly, each of the one or more processors 114 may be an integrated circuit, a microchip, a computer, or any other computing device. The one or more processors 114 are communicatively coupled to the other components of the first vehicle 102 by the communication path 110. Accordingly, the communication path 110 may communicatively couple any number of processors with one another, and allow the modules coupled to the communication path 110 to operate in a distributed computing environment. Specifically, each of the modules may operate as a node that may send and/or receive data.

Each of the one or more memory modules 116 of the first vehicle 102 is coupled to the communication path 110 and communicatively coupled to the one or more processors 114. The one or more memory modules 116 may include RAM, ROM, flash memories, hard drives, or any device capable of storing machine readable instructions such that the machine readable instructions may be accessed and executed by the one or more processors 114. The machine readable instructions may include logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable instructions and stored on the one or more memory modules 116. In some embodiments, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components. In embodiments, the one or more memory modules 116 may include machine learning capabilities configured to determine a driver classification of the first vehicle 102, as discussed in more detail herein. Alternatively, the driver classification may be determined at the edge server 104.

As noted above, the first vehicle 102 includes the network interface hardware 112 for communicatively coupling the first vehicle 102 with the edge server 104 via a network 118. The network interface hardware 112 is coupled to the communication path 110 such that the communication path 110 communicatively couples the network interface hardware 112 to other modules of the first vehicle 102. The network interface hardware 112 may be any device capable of transmitting and/or receiving data via a wireless network. Accordingly, the network interface hardware 112 may include a communication transceiver for sending and/or receiving data according to any wireless communication standard. For example, the network interface hardware 112 may include a chipset (e.g., antenna, processors, machine readable instructions, etc.) to communicate over wireless computer networks such as, for example, wireless fidelity (Wi-Fi), WiMax, Bluetooth®, IrDA, Wireless USB, Z-Wave, ZigBee, or the like. In some embodiments, the network interface hardware 112 includes a Bluetooth® transceiver that enables the first vehicle 102 to exchange information with a mobile device such as, for example, a smartphone, via Bluetooth® communication.

In embodiments, the first vehicle 102 includes one or more driving sensors 120 communicatively coupled to the other components of the first vehicle 102 via the communication path 110. The one or more driving sensors 120 may include, for example, a camera, a sensor for detecting operation of the steering wheel, a speed sensor, and the like. The one or more driving sensors 120 are configured to collect first vehicle driving data that is used to determine a driving behavior, i.e., a driver classification, of the first vehicle 102, as discussed in more detail herein. In some embodiments, the one or more driving sensors 120 may include one or more optical components, such as a mirror, fish-eye lens, or any other type of lens. In some embodiments, the one or more driving sensors 120 include one or more imaging sensors configured to operate in the visual and/or infrared spectrum to sense visual and/or infrared light. Additionally, while the particular embodiments described herein are described with respect to hardware for sensing light in the visual and/or infrared spectrum, it is to be understood that other types of sensors are contemplated. For example, the sensors described herein may include one or more LIDAR sensors, radar sensors, sonar sensors, or other types of sensors and that such data could be integrated into or supplement the data collection as described herein.

In embodiments, the first vehicle 102 includes a location sensor 122 communicatively coupled to the other components of the first vehicle 102 via the communication path 110. The location sensor 122 may be, for example, a GPS module, configured to capture location data indicating a location of the first vehicle 102. As described in more detail herein, the location data is utilized to correlate a driving behavior of the first vehicle 102 with a particular trip to identify changes in driving patterns. In embodiments, the driving behavior at a particular location can also be compared to a driving behavior of another vehicle at the same location to more accurately classify the driving behavior of the first vehicle 102 based on a driving behavior of another vehicle at the same location.

In embodiments, the first vehicle 102 includes a display device 124 for providing visual output such as, for example, notifications, entertainment, maps, navigation, information, or a combination thereof. In particular, the display device 124 provides notifications of an insurance rate received from an insurance provider 126, updates to an existing insurance rate, requests to collect additional user data of a driver of the first vehicle 102, and the like. The display device 124 is coupled to the communication path 110 and communicatively coupled to the one or more processors 114. Accordingly, the communication path 110 communicatively couples the display device 124 to other modules of the first vehicle 102. The display device 124 may include any medium capable of transmitting an optical output such as, for example, a cathode ray tube, light emitting diodes, a liquid crystal display, a plasma display, projection display, holographic display, augmented display, or the like. Moreover, the display device 124 may be a touchscreen that, in addition to providing optical information, detects the presence and location of a tactile input upon a surface of or adjacent to the display. Accordingly, the display device 124 may receive mechanical input directly upon the optical output provided by the display device 124.

Figure 2:
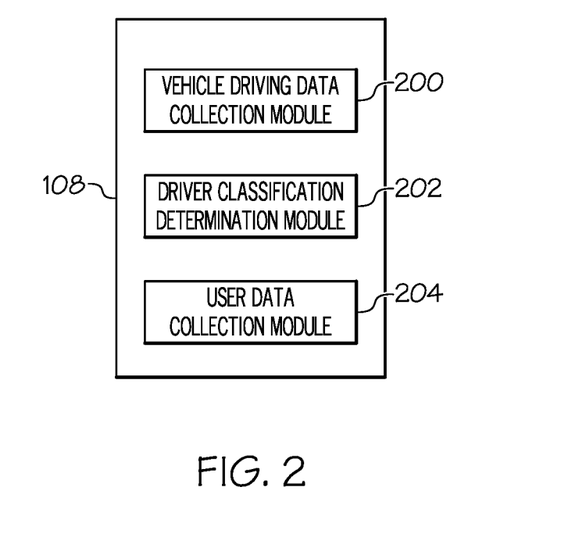
FIG. 2 schematically depicts a controller of the first vehicle of FIG. 1, according to one or more embodiments shown and described herein.

Now referring to FIG. 2, an exemplary controller 108 of the first vehicle 102 is shown. In embodiments, the controller 108 includes a vehicle driving data collection module 200, a driver classification determination module 202, and a user data collection module 204. Each of the vehicle driving data collection module 200, the driver classification determination module 202, and the user data collection module 204 may be a program module in the form of operating systems, application program modules, and other program modules stored in the one or more memory modules 116. Such a program module may include, but is not limited to, routines, subroutines, programs, objects, components, data structures and the like for performing specific tasks or executing specific data types as will be described below.

The vehicle driving data collection module 200 stores information collected by the one or more driving sensors 120 and the location sensors 122. In embodiments, the vehicle driving data collection module 200 stores information such as, for example, a frequency of a speed of the first vehicle 102 exceeding of a predetermined speed threshold, a frequency of braking of the first vehicle 102 in excess of a predetermined deceleration threshold, a frequency of detected accidents of the first vehicle 102 detected by an imaging device, an impact sensor, or the like, a frequency of lane changes of the first vehicle 102 detected by an imaging device, a sensor detecting a steering direction of the first vehicle 102, and the like, frequency of an instant fuel economy falling below a predetermined fuel economy threshold, and the like. It should be appreciated that the above examples of vehicle driving data is a non-exhaustive list of information that may be taken into consideration when determining the driver classification of the first vehicle 102, as discussed in more detail herein.

In embodiments, the vehicle driving data collection module 200 may assign a location and a timestamp, determined by the location sensor 122, to each piece of information. By associating each piece of information to a known location and time, the first vehicle driving data may be compared to driving data of additional vehicles at the same or similar location and/or at the same or similar time/day.

As noted above, in embodiments, the controller 108 of the first vehicle 102 may include the driver classification determination module 202. The driver classification determination module 202 includes a machine learning algorithm for determining a driver classification based on the first vehicle driving data collected and stored in the vehicle driving data collection module 200. The machine learning algorithm may be trained based on previously received driving data from other vehicles and a determined driver classification associated with those vehicles based on the received driving data. It should be appreciated that the driver classification learning model may be continually updated as discussed herein. In embodiments, the driver classification may be categorized as one of an expert classification, a competent classification, and a reckless classification. A driver classification may be classified as a reckless classification, for example, if the first vehicle driving data indicates one or more of the first vehicle 102 drove more than 20 mph over the speed limit, was in a severe accident, experienced a number of brakes in excess of a first predetermined number of brakes, experienced a number of lane changes in excess of a first predetermined number of lane changes, and the like. A driver classification may be classified as a competent classification, for example, if the first vehicle driving data indicates one or more of the first vehicle 102 drove between 5 mph and 20 mph over the speed limit, was in a minor accident, experienced a number of brakes in excess of a second predetermined number of brakes less than the first predetermined number of brakes, experienced a number of lane changes in excess of second predetermined number of lane changes less than the first predetermined number of lane changes, and the like. A driver classification may be classified as an expert classification, for example, if the first vehicle driving data indicates one or more of the first vehicle 102 drove less than 5 over the speed limit, was not in any accidents, experienced a number of brakes in excess of a third predetermined number of brakes less than the second predetermined number of brakes, experienced a number of lane changes in excess of a third predetermined number of lane changes less than the second predetermined number of lane changes, and the like. While the above describes three driver classifications, the driver classifications may be more than three or less than three classifications.

As noted above, in embodiments, the controller 108 of the first vehicle 102 includes a user data collection module 204. The user data collection module 204 is configured to receive and collect user data such as, for example, a gender of the driver, an age of the driver, and an ethnicity of the driver. The user data may be collected based on a known user profile associated with the driver of the first vehicle 102 or provided by the driver of the first vehicle 102 by, for example, input at the display device 124. In doing so, the driver of the first vehicle 102 may input the user data to the extent desired. As described in detail herein, a reduced insurance rate may be provided for those vehicles that provide user data to the insurance provider 126, thereby providing an incentive for vehicles to collect user data in addition to the vehicle driving data. In some embodiments, the first vehicle 102 may identify the driver of the first vehicle 102 by capturing images of the driver using in-vehicle cameras and processes the captured images. In some embodiments, the first vehicle 102 may identify the driver of the first vehicle 102 by recognizing the voice of the driver.

Referring again to FIG. 1, the network 118 may include one or more computer networks (e.g., a personal area network, a local area network, or a wide area network), cellular networks, satellite networks and/or a global positioning system and combinations thereof Accordingly, the first vehicle 102 can be communicatively coupled to the network 118 via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth®, Wireless USB, Z-Wave, Zig-Bee, and/or other near field communication protocols. Suitable cellular networks include, but are not limited to, technologies such as LTE, WiMAX, UMTS, CDMA, and GSM.

Still referring to FIG. 1, the edge server 104 includes a controller 128, a communication path 130, and network interface hardware 132. The controller 128 includes one or more processors 134 and one or more memory modules 136. The components of the edge server 104 may be structurally similar to and have similar functions as the corresponding components of the first vehicle 102 (e.g., the controller 128 corresponds to the controller 108, the communication path 130 corresponds to the communication path 110, and the network interface hardware 132 corresponds to the network interface hardware 112).

The network interface hardware 132 of the edge server 104 is configured to receive the first vehicle driving data from the first vehicle 102, either directly or indirectly via the network 118. As discussed in more detail herein, in embodiments, the edge server 104 is provided with a driver classification learning model and processes the first vehicle driving data using the driver classification learning model to determine a driver classification of the first vehicle 102. The edge server 104 transmits both the driver classification learning model and the determined driver classification, determined by either the first vehicle 102 or the edge server 104, to the central server 106 via the network 118.

Figure 3:
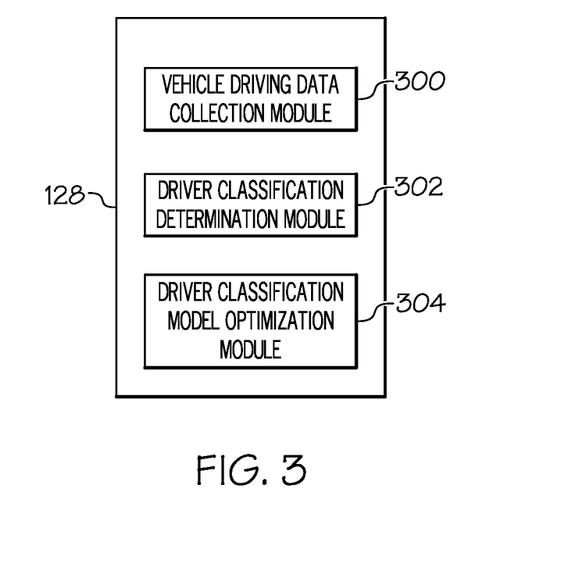
FIG. 3 schematically depicts a controller of the edge server of FIG. 1, according to one or more embodiments shown and described herein.

Referring now to FIG. 3, an exemplary controller 128 of the edge server 104 is shown. In embodiments, the controller 128 includes a vehicle driving data collection module 300, a driver classification determination module 302, and a driver classification model optimization module 304. Each of the vehicle driving data collection module 300, the driver classification determination module 302, and the driver classification model optimization module 304 may be a program module in the form of operating systems, application program modules, and other program modules stored in the one or more memory modules 136. Such a program module may include, but is not limited to, routines, subroutines, programs, objects, components, data structures and the like for performing specific tasks or executing specific data types as will be described below.

Similar to the vehicle driving data collection module 200 of the first vehicle 102, the edge server 104 also includes a vehicle driving data collection module 300. The vehicle driving data collection module 300 stores the first vehicle driving data received from the first vehicle 102. However, the vehicle driving data collection module 300 of the edge server 104 also stores vehicle driving data received from a plurality of additional vehicles as well. As discussed in more detail herein, a process of determining a driver classification of the first vehicle 102 may be optimized based on vehicle driving data collected from the additional vehicles.

Similar to the driver classification determination module 202 of the first vehicle 102, the driver classification determination module 302 of the edge server 104 determines a driver classification of the first vehicle 102 based on the first vehicle driving data collected and stored in the vehicle driving data collection module 300. Specifically, the driver classification determination module 302 develops a driver classification learning model including a machine learning algorithm configured to determine the driver classification. In determining the driver classification of the first vehicle 102, the driver classification learning model associated with the first vehicle 102 processes the first vehicle driving data stored in the vehicle driving data collection module 300. As noted above, the driver classification may be categorized as one of an expert classification, a competent classification, and a reckless classification. The driver classification may also be assigned a score, e.g., 0%-100%, such that a reckless classification gets a low score and the expert classification gets a high score.

In embodiments in which the first vehicle 102 includes machine learning capabilities and determines the driver classification, as discussed herein, the driver classification learning model may be sent from the first vehicle 102 to the edge server 104. As such, the driver classification determination module 302 may include a plurality of driver classification learning models received from a plurality of vehicles, such as the first vehicle 102 and a plurality of additional vehicles.

In embodiments, the driver classification model optimization module 304 may create an optimized driver classification learning model by processing each of the individual driver classification learning models and the particular driver classification determined by utilizing each of the individual driver classification learning models. More specifically, the driver classification model optimization module 304 may create an optimized driver classification learning model by determining a closeness of each individual driver classification learning model and an accuracy of the determined driver classification based on the vehicle driving data associated with that driver classification. In some embodiments, the driver classification model optimization module 304 may create an optimized driver classification learning model by calculating a weighted average of the plurality of driver classification learning models received from the plurality of vehicles. In embodiments, the optimized driver classification learning model or alternatively the individual driver classification learning models received from the first vehicle 102 and the plurality of additional vehicles may be sent to the central server 106.

Still referring to FIG. 1, the central server 106 includes a controller 138, a communication path 140, and network interface hardware 142. The controller 138 includes one or more processors 144 and one or more memory modules 146. As with the edge server 104, the components of the central server 106 may be structurally similar to and have similar functions as the corresponding components of the first vehicle 102 (e.g., the controller 138 corresponds to the controller 108, the communication path 140 corresponds to the communication path 110, and the network interface hardware 142 corresponds to the network interface hardware 112).

As noted above, the central server 106 receives the driver classification learning model and the driver classification of the first vehicle 102 from the edge server 104 or, in embodiments, the optimized driver classification learning model from the edge server 104. Additionally, the central server 106 receives a driver classification learning model, or optimized driver classification learning model, from a plurality of additional edge servers and a driver classification of a plurality of additional vehicles, either from the edge server 104 or the plurality of additional edge servers. Based on the driver classification learning model(s) received from the plurality of additional edge servers, the central server 106 is configured to optimize the received driver classification learning models to create a global driver classification learning model. More particularly, the global driver classification learning model is created by training the machine learning algorithm based on the driving data received from the edge server 104 and the additional edge servers, and the driver classification associated with the driving data. As such, it should be appreciated that the global driver classification learning model is created in a similar manner as the optimized driver classification learning model by processing a plurality of driver classification learning models.

Still referring to FIG. 1, the insurance provider 126 includes a controller 148, a communication path 150, and network interface hardware 152. The controller 148 includes one or more processors 154 and one or more memory modules 156. As with the edge server 104, the components of the insurance provider 126 may be structurally similar to and have similar functions as the corresponding components of the first vehicle 102 (e.g., the controller 148 corresponds to the controller 108, the communication path 150 corresponds to the communication path 110, and the network interface hardware 152 corresponds to the network interface hardware 112).

As noted above, the insurance provider 126 receives the driver classification of the first vehicle 102 from the central server 106, as well as the driver classification for the additional vehicles. In doing so, the insurance provider 126 processes the driver classification of the first vehicle 102 to determine an insurance rate for the first vehicle 102. It should be appreciated that, in embodiments, the insurance rate for the first vehicle 102 is determined solely on the driver classification of the first vehicle 102 as opposed to additional user data. However, as discussed herein, the first vehicle 102 may collect user data, which may be sent to the insurance provider 126, via the edge server 104 and the central server 106, to provide additional data points utilized by the insurance provider 126 to determine an appropriate insurance rate for the first vehicle 102. In embodiments, the insurance provider 126 may provider a reduced insurance rate in response to the first vehicle 102 providing user data.

Figure 4:
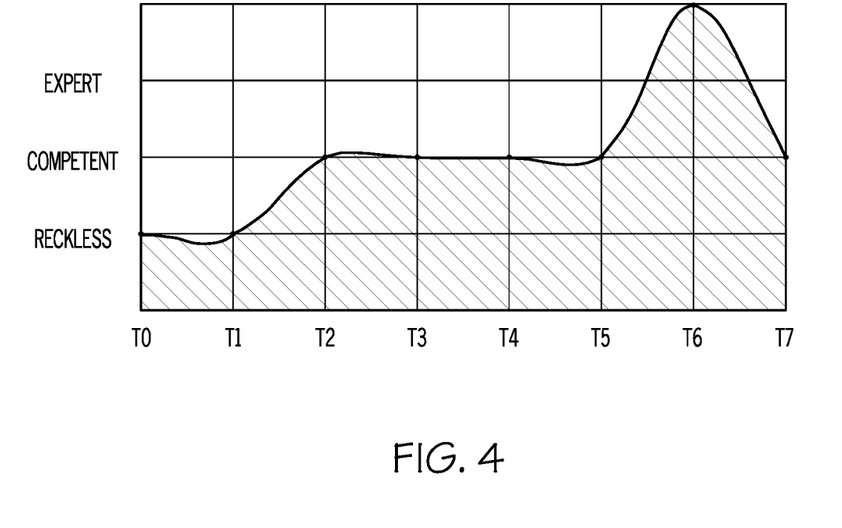
FIG. 4 schematically depicts a graph illustrating a driver classification for individual trips over time, according to one or more embodiments shown and described herein.

Referring now to FIG. 4, a chart is illustrated indicating a driver classification over time for each specific trip as supplemental first vehicle driving data is collected. As such, each trip of the first vehicle 102 receives a driver classification. As shown, the first vehicle 102 takes a trip at T1 and T2 that each receives a score associated with a "reckless" driver classification. The first vehicle 102 also takes a trip at T2, T3, T4, T5, and T7 that each receives a score associated with a "competent" driver classification. The first vehicle 102 also takes a trip at T6 that receives a score associated with an "expert" driver classification. Thus, it should be appreciated that in embodiments in which the edge server 104 determines the driver classifications, the first vehicle 102 sends the first vehicle driving data to the edge server 104 for each trip.

Figure 5:
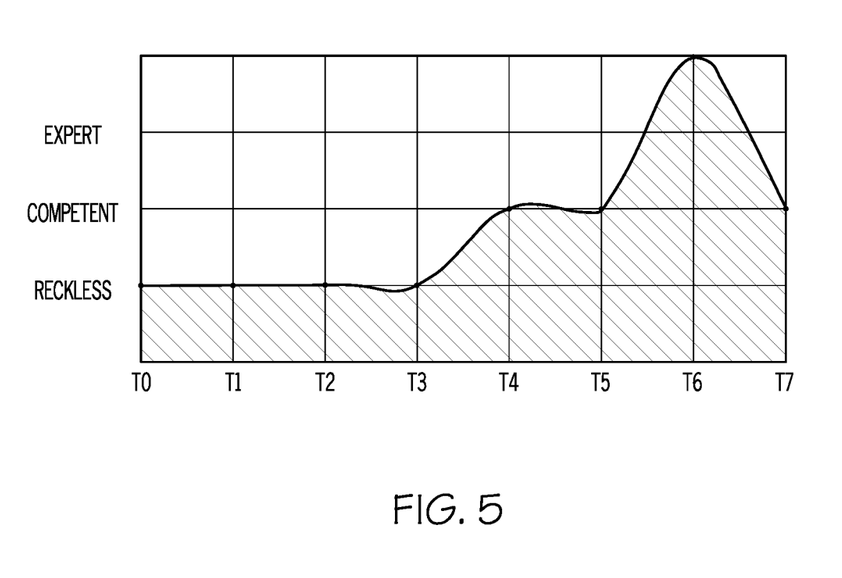
FIG. 5 schematically depicts a graph illustrating a cumulative driver classification over time, according to one or more embodiments shown and described herein.

As shown in FIG. 5, a chart is illustrated indicating a cumulative driver classification over time taking into account the determined driver classification for each previous trip as supplemental first vehicle driving data is collected. The cumulative driver classification does not change from trip to trip, but changes over time. As such, it can be seen from FIG. 5 that the driver classification remained as a "reckless" driver classification from time T0-T3, rather than T0-T1 in FIG. 4, until the first vehicle 102 has completed a sufficient number of additional trips to change the driver classification from "reckless" to "competent." By providing this cumulative approach to determine a driver classification based on previous trips, the likelihood of a driver classification being significantly affected based on one trip is reduced.

The edge server 104 may send the driver classification for each trip to the central server 106 in real time, which determines the cumulative driver classification, such that the central server 106 receives a driver classification for the first vehicle 102 after each trip. Alternatively, the edge server 104 may wait to send the cumulative driver classification to the central server 106 after a predetermined number of trips or a predetermined time period has passed, thereby reducing the amount of data being sent to the central server 106 from the edge server 104.

Alternatively, in embodiments in which the first vehicle 102 determines the driver classification, the first vehicle 102 may send the driver classification for each trip to the edge server 104 in real time, which determines the cumulative driver classification, such that the edge server 104 receives a driver classification for the first vehicle 102 after each trip. Alternatively, the first vehicle 102 may wait to send the cumulative driver classification to the edge server 104 after a predetermined number of trips or a predetermined time period has passed, thereby reducing the amount of data being sent to the edge server 104 from the first vehicle 102.

Figure 6:
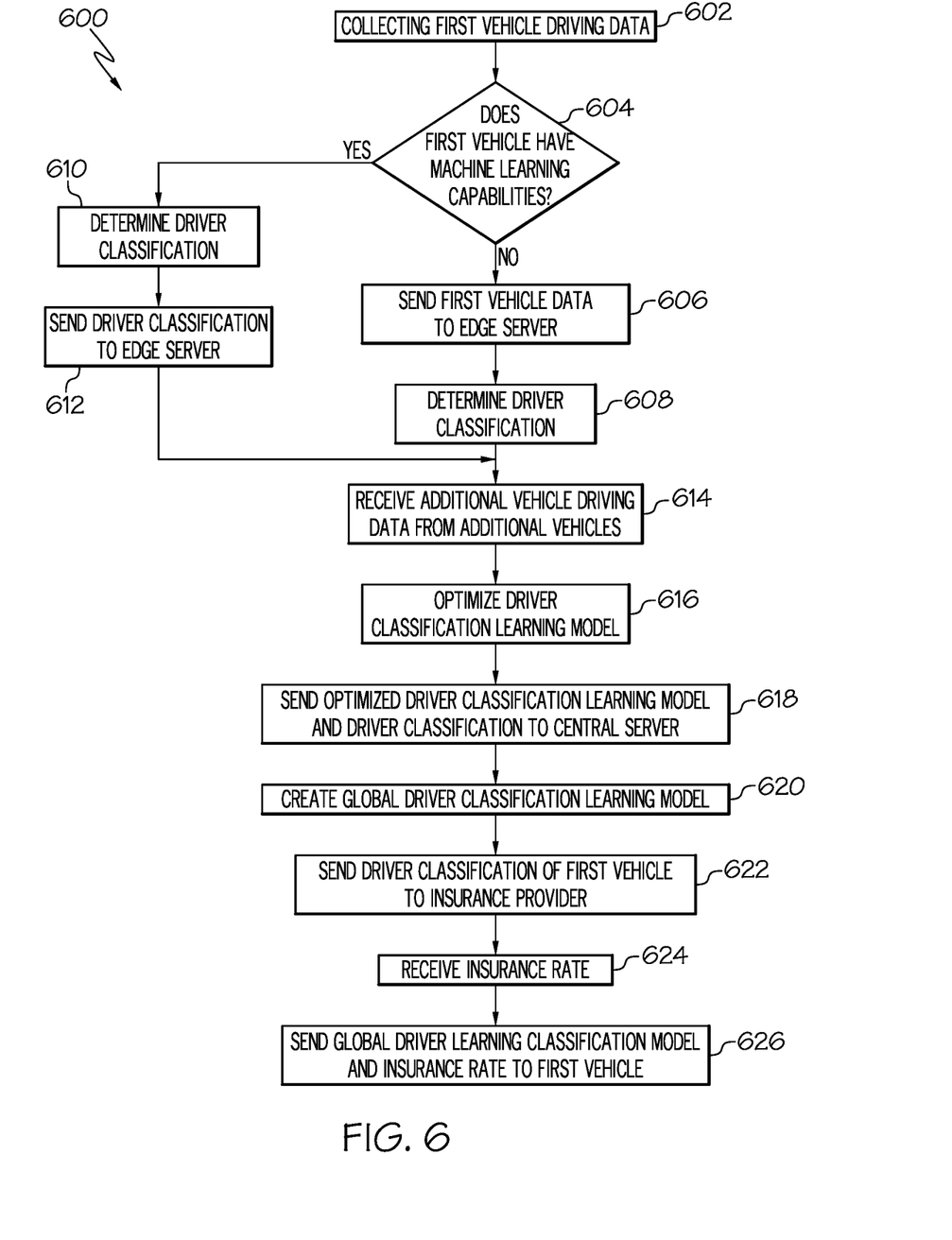
FIG. 6 schematically depicts a flowchart of an illustrative method for determining a driver classification and obtaining an insurance rate, according to one or more embodiments shown and described herein.

Referring now to FIG. 6, a method 600 is depicted for determining a driver classification of the first vehicle 102 and receiving an insurance rate for the first vehicle 102 from an insurance provider 126. The method 600 is discussed with reference to the driver classification system 100 and individual components thereof illustrated in FIGS. 1-3.

At step 602, the first vehicle driving data is collected and stored in the vehicle driving data collection module 200 of the first vehicle 102. As discussed herein, the first vehicle driving data may include, for example, a frequency of a speed of the first vehicle 102 exceeding of a predetermined speed threshold, a frequency of braking of the first vehicle 102 in excess of a predetermined deceleration threshold, a frequency of detected accidents of the first vehicle 102 detected by an imaging device, an impact sensor, or the like, and a frequency of lane changes of the first vehicle 102 detected by an imaging device, a sensor detecting a steering direction of the first vehicle 102, and the like, frequency of an instant fuel economy falling below a predetermined fuel economy threshold, and the like.

At step 604, it is determined whether the first vehicle 102 has machine learning capabilities such that the first vehicle 102 itself may determine the driver classification of the first vehicle 102. If the first vehicle 102 does not have machine learning capabilities, the method 600 proceeds to step 606 at which the first vehicle 102 sends the first vehicle driving data to the edge server 104, which is stored in the vehicle driving data collection module 300 of the edge server 104. At step 608, the driver classification determination module 302 of the edge server 104 determines the driver classification in the manner discussed herein. Specifically, the driver classification determination module 302 utilizes a driver classification learning model including a machine learning algorithm to assign a driver classification to the first vehicle 102 based on the received first vehicle driving data.

Alternatively, if it is determined at step 604 that the first vehicle 102 does have machine learning capabilities to determine the driver classification, the method 600 proceeds to step 610. At step 610, the driver classification determination module 202 of the first vehicle 102 determines the driver classification in the same manner as that discussed herein with respect to the edge server 104 determining the driver classification. Once the driver classification is determined by the first vehicle 102, the driver classification is sent to the edge server 104 at step 612.

At step 614, the edge server 104 receives additional vehicle driving data from additional vehicles and stores the additional vehicle driving data in the vehicle driving data collection module 300 of the edge server 104. In embodiments, the edge server 104 also receives additional driver classification learning models from those additional vehicles. As such, at step 616, in embodiments, the driver classification model optimization module 304 of the edge server 104 may create an optimized driver classification learning model by processing the individual driver classification learning models provided by the first vehicle 102 and the additional vehicles, as discussed herein.

At step 618, the optimized driver classification learning model and the driver classification of the first vehicle 102 are sent to the central server 106. It should be appreciated that it is not necessary to send the first vehicle driving data to the central server 106 as the driver classification will have already been determined by this point, either by the first vehicle 102 or the edge server 104.

At step 620, the central server 106 processes the driver classification learning models received from the edge server 104 and the plurality of additional edge servers, as well as any previously optimized driver classification learning models, to create a global driver classification learning model. It should be appreciated that the global driver classification learning model is created in a similar manner in which the optimized driver classification learning model is created.

At step 622, the driver classification of the first vehicle 102 is sent from the central server 106 to the insurance provider 126. As such, it is not necessary to send the first vehicle driving data to the insurance provider 126 as the only information required is the specific driver classification of the first vehicle 102. By restricting the information sent to the insurance provider 126 to only the driver classification, the amount of traffic received at the insurance provider 126 and processing power required at the insurance provider 126 is reduced. This results in the insurance provider 126 determining an appropriate insurance rate for the first vehicle 102 in less time.

At step 624, the insurance rate for the first vehicle 102 provided by the insurance provider 126 is received at the central server 106. Thereafter, at step 626, the global driver classification learning model created by the central server 106 and the insurance rate are sent to the edge server 104, which are subsequently sent to the first vehicle 102. In embodiments, the global driver classification learning model and the insurance rate may be sent directly to the first vehicle 102 from the central server 106. In embodiments, it should be appreciated that the insurance rate may be sent directly to the first vehicle 102 if the first vehicle 102 is permitted to communicate directly with the insurance provider 126.

Once the insurance rate is received at the first vehicle 102, the insurance rate may be displayed on the display device 124 of the first vehicle 102. In embodiments, the driver may approve or deny the insurance rate or, alternatively, the insurance rate may be automatically approved to reduce or increase an existing policy of the driver of the first vehicle 102.

It should be appreciated that steps 602-626 are repeated as the first vehicle 102 continues to be operated. As such, the first vehicle 102 may receive regular updated insurance rates in response to the driver classification changing over time. For example, the insurance rate associated with the first vehicle 102 may increase in response to determining that the driver classification changes from an expert classification to a competent classification or a reckless classification. Similarly, the insurance rate associated with the first vehicle 102 may increase in response to determining that the driver classification changes from a competent classification to a reckless classification. Alternatively, the insurance rate associated with the first vehicle 102 may decrease in response to determining that the driver classification changes from a reckless classification to a competent classification or an expert classification. Similarly, the insurance rate associated with the first vehicle 102 may decrease in response to determining that the driver classification changes from a competent classification to an expert classification.

As discussed herein, the driver of the first vehicle 102 may authorize additional information to be collected at the first vehicle 102 and sent to the insurance provider 126 along with the driver classification. Specifically, the driver may provide user data such as, for example, a gender of the driver, an age of the driver, and an ethnicity of the driver. The user data may be entered into the display device 124 of the first vehicle 102 and transmitted to the edge server 104 along with the first vehicle driving data. Upon the insurance provider 126 receiving the user data in addition to the driver classification of the first vehicle 102, the insurance provider 126 may provide a reduced insurance rate as an incentive for providing the user data.

In embodiments, a further incentive to receive a reduced insurance rate may be provided to the first vehicle 102 if a driving profile of the first vehicle 102 is permitted to be shared with the additional vehicles. Specifically, a driving profile of the first vehicle 102 may be created indicating driving characteristics of the first vehicle 102, or more particularly a driver of the first vehicle 102. The first vehicle 102 may confirm that the driving profile of the first vehicle 102 may be shared with the additional vehicles by utilizing the display device 124 of the first vehicle 102. Thereafter, the driving profile of the first vehicle 102 may be selected by one or more of the additional vehicles to operate the additional vehicle in a manner similar to operation of the first vehicle 102. For example, the additional vehicle may operate the acceleration, brakes, steering, and the like similar to the first vehicle 102 in similar instances. If the additional vehicle is an autonomous or semi-autonomous vehicle, the additional vehicle may automatically operate the additional vehicle in accordance with the driving profile of the first vehicle 102. Alternatively, if the additional vehicle is not an autonomous vehicle or a semi-autonomous vehicle, the additional vehicle may provide notifications and/or alerts to indicate that the additional vehicle should be operated in a particular manner in accordance with the driving profile of the first vehicle 102.

From the above, it is to be appreciated that defined herein is a driver classification system and method for assigning a driver classification to a vehicle for purposes of sending the driver classification to an insurance provider and obtaining an insurance rate. As discussed herein, the driver classification is determined by processing first driver data using a driver classification learning model powered by a machine learning algorithm. Further the driver classification learning model may be optimized based on additional driver classification learning models received from additional edge servers and additional vehicles.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method comprising:
collecting first vehicle driving data from a first vehicle;
processing the first vehicle driving data using a driver classification learning model including a machine learning algorithm at the first vehicle to assign a driver classification to the first vehicle;
updating the driver classification learning model based on additional driver classification learning models received from a plurality of additional vehicles to create an optimized driver classification learning model by calculating a weighted average of the additional driver classification learning models;
sending the driver classification to an insurance provider;
receiving an insurance rate for the first vehicle from the insurance provider based on the driver classification of the first vehicle; and
providing the insurance rate to the first vehicle.

2. The method of claim 1, wherein the driver classification is selected from one of an expert classification, a competent classification, and a reckless classification.

3. The method of claim 2, wherein the driver classification of the first vehicle is subject to change over time based on supplemental first vehicle driving data being collected from the first vehicle and sent to the insurance provider.

4. The method of claim 3, wherein:
the insurance rate associated with the first vehicle is increased in response to determining that the driver classification changes from one of the expert classification and the competent classification to one of the competent classification and the reckless classification; and
the insurance rate associated with the first vehicle is decreased in response to determining that the driver classification changes from one of the reckless classification and the competent classification to one of the competent classification and the reckless classification.

5. The method of claim 1, wherein the first vehicle driving data includes one or more of a frequency of a speed in excess of a speed threshold, a frequency of braking in excess of a deceleration threshold, a frequency of detected accidents, and a frequency of lane changes.

6. The method of claim 1, further comprising displaying a request that user data of a driver of the first vehicle be collected, the user data including one or more of a gender of the driver, an age of the driver, and an ethnicity of the driver.

7. The method of claim 6, wherein the insurance rate is decreased in response to identifying that the first vehicle approves the request to permit user data of the driver of the first vehicle to be collected.

8. The method of claim 1, further comprising:
determining the driver classification at the first vehicle;
sending the driver classification and the driver classification learning model from the first vehicle to an edge server; and
receiving, at the edge server, the additional driver classification learning models from the plurality of additional vehicles.

9. A driver classification system comprising:
a controller configured to:
collect first vehicle driving data from a first vehicle;
process the first vehicle driving data at the first vehicle using a driver classification learning model including a machine learning algorithm to assign a driver classification to the first vehicle;
receive additional driver classification learning models from a plurality of additional vehicles;
update the driver classification learning model of the first vehicle based on the additional driver classification learning models received from the plurality of additional vehicles to create an optimized driver classification learning model by calculating a weighted average of the additional driver classification learning models;
receive an insurance rate for the first vehicle from an insurance provider based on the driver classification of the first vehicle; and
provide the insurance rate and the updated driver classification learning model to the first vehicle.

10. The driver classification system of claim 9, wherein the driver classification is selected from one of an expert classification, a competent classification, and a reckless classification.

11. The driver classification system of claim 10, wherein the driver classification of the first vehicle is subject to change over time based on supplemental first vehicle driving data being collected from the first vehicle and sent to the insurance provider.

12. The driver classification system of claim 11, wherein:
the insurance rate associated with the first vehicle is increased in response to determining that the driver classification changes from one of the expert classification and the competent classification to one of the competent classification and the reckless classification; and
the insurance rate associated with the first vehicle is decreased in response to determining that the driver classification changes from one of the reckless classification and the competent classification to one of the competent classification and the reckless classification.

13. The driver classification system of claim 9, wherein the first vehicle driving data includes one or more of a frequency of a speed in excess of a speed threshold, a frequency of braking in excess of a deceleration threshold, a frequency of detected accidents, and a frequency of lane changes.

14. The driver classification system of claim 9, wherein the controller is configured to instruct the first vehicle to display a request that user data of a driver of the first vehicle be collected, the user data including one or more of a gender of the driver, an age of the driver, and an ethnicity of the driver.

15. The driver classification system of claim 14, wherein the insurance rate is decreased in response to identifying that the first vehicle approves the request to permit user data of the driver of the first vehicle to be collected.

16. The driver classification system of claim 9, wherein the controller is configured to:

send the driver classification learning model of the first vehicle and the additional driver classification learning models from the additional vehicles to a central server;

receive a global classification learning model from the central server; and send the global classification learning model to the first vehicle.

17. The driver classification system of claim 9, wherein the controller is configured to:

receive the additional driver classification learning models only from the additional vehicles located within a predetermined geographic region; and communicate with edge servers located in different geographic regions.

* * * * *

UNITED STATES PATENT AND TRADEMARK OFFICE
CERTIFICATE OF CORRECTION

| | |
|---|---|
| PATENT NO. | : 11,776,064 B2 |
| APPLICATION NO. | : 17/410536 |
| DATED | : October 3, 2023 |
| INVENTOR(S) | : Rohit Gupta et al. |

It is certified that error appears in the above-identified patent and that said Letters Patent is hereby corrected as shown below:

In the Specification

In Column 9, Line(s) 48, after "may", delete "provider" and insert --provide--, therefor.

Signed and Sealed this
Twenty-eighth Day of November, 2023

Katherine Kelly Vidal
*Director of the United States Patent and Trademark Office*